WIRE CUTTING APPARATUS COMPRISING A ROTARY WIRE CARRIER MOVABLE PAST A FIXED CUTTER

Filed March 25, 1955

INVENTOR:
Walter J. Gorecki,
BY
Dawson, Tilton & Graham,
ATTORNEYS.

United States Patent Office 2,929,289

Patented Mar. 22, 1960

2,929,289

WIRE CUTTING APPARATUS COMPRISING A ROTARY WIRE CARRIER MOVABLE PAST A FIXED CUTTER

Walter J. Gorecki, Chicago, Ill.

Application March 25, 1955, Serial No. 496,654

8 Claims. (Cl. 83—411)

Figures 1, 2, 3:
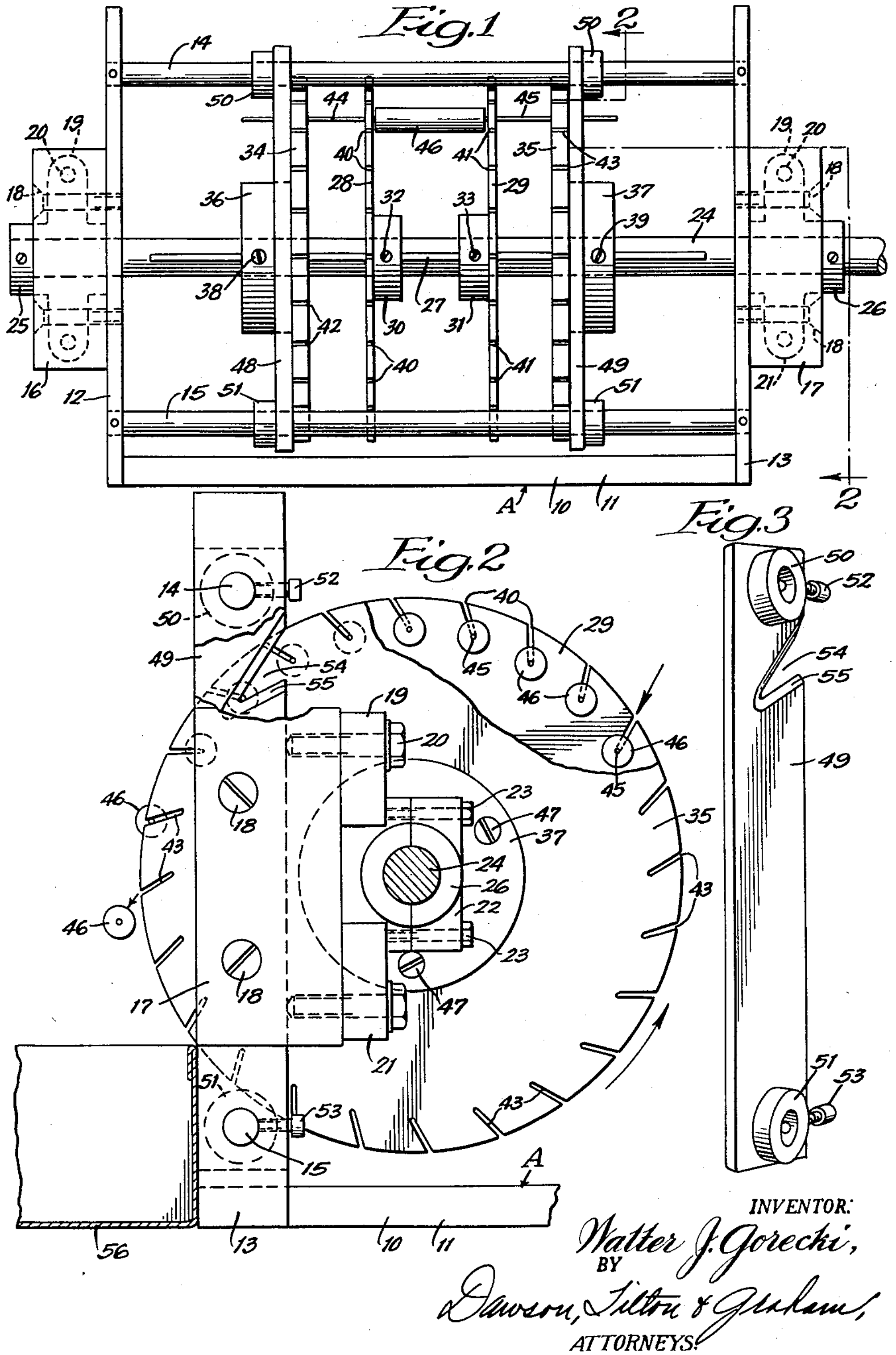

This invention relates to severing apparatus, and more especially to wire cutting apparatus useful in severing the lead wires of electronic components such as resistors and capacitors, etc. to predetermined lengths.

It is well known that electronic equipment is complex and includes vast numbers of circuit components such as resistors and capacitors. In such equipment circuit components in considerable numbers are fitted into relatively small areas, and it is necessary that the lead-in wires of the circuit components have certain predetermined lengths so that the components may be fitted into the limited spaces provided in the chassis of electronic equipment. Since circuit design and the space limitations of the chassis vary considerably, it is necessary that circuit components be provided by the manufacturer with lead-in wires of sufficient length so that the components can be made to accommodate any circuit and chassis design. As a result, it is usually necessary to cut the lead wires of circuit components to the lengths required in each situation.

Presently, lead-in wires are severed in hand operation, for example, the customary procedure is for the workman to measure the lead-in wires of components and then sever the same with wire cutters. This is a tedious and time-consuming operation and, as a result, is an expensive operation. The measuring and severing is carried out as a hand operation for no equipment is now available that is capable of operating effectively to sever at appropriate lengths the lead-in wires of electronic circuit components.

One of the reasons for this is that circuit components, and especially resistors and capacitors, are shipped to the user in bulk, and it will be appreciated that the lead-in wires are ordinarily bent and twisted, etc. which makes them difficult to be measured and cut in automatic or semi-automatic machinery. Further, such circuit components come in all conceivable sizes and shapes, and it is then difficult to provide apparatus capable of accommodating the vast variety of sizes and shapes that must be dealt with.

It is, accordingly, an object of this invention to provide severing apparatus useful in cutting the lead wires of electronic circuit components to predetermined lengths. Another object of the invention is to provide wire cutting apparatus capable of accommodating without change circuit components that may have any of myriad shapes, and which is adjustable so as to accommodate circuit components of various size, and is further adjustable for severing the lead wires at any length that may be required. Still another object is in the provision of apparatus as described in which the wire severing operations are effectively carried out irrespective of whether the lead-in wires are straight or are bent or twisted, as is the usual case, so long as the wires are sufficiently straight so as to be received within positioning members provided by the apparatus.

A further object is in providing wire severing apparatus of the character described wherein circuit components are positively held in position and the lead wires thereof positively positioned and severed at the appropriate lengths. Yet a further object is in providing wire cutting apparatus useful in severing the lead wires of circuit components at required lengths and that employs a plurality of rotatable discs provided with aligned slots adapted to receive the lead wires therein, certain of the discs being arranged for holding the circuit components while other of the discs are operative in conjunction with stationary cutting knives to sever the lead wires. Additional objects and advantages will appear as the specification proceeds.

An embodiment of the invention is illustrated in the accompanying drawing, in which:

Figure 1 is a side view in elevation of the wire cutting apparatus; Figure 2 is a transverse sectional view taken on the line 2—2 of Figure 1; and Figure 3 is a perspective view of one of the cutting knives employed in the apparatus.

The severing apparatus is designated with the letter A, and comprises a frame 10 having a base plate 11, and rigidly secured thereto at opposite ends a pair of upwardly extending standards 12 and 13. Extending between the standards 12 and 13 and rigidly secured thereto by set screws or pins, as is shown in Figure 1, is an upper shaft 14 and a lower shaft 15. The shafts 14 and 15 are spaced apart and extend in parallel relation and are substantially parallel to the base 11. As is seen in Figure 1, the lowermost shaft 15 is spaced above the base 11.

The standards 12 and 13 are equipped respectively with mounting members 16 and 17 that are secured thereto by cap screws 18 (Figure 2). The mounting members extend forwardly of the standards 12 and 13, and have rigidly secured thereto along their forward sides bearing members 19. If desired, the bearing members 19 may be secured to the mounting members 17 by cap screws 20. The bearing members 19 are in the form of pillow bearings and have the usual separable sections 21 and 22, the section 22 being secured to the section 21 by cap screws 23. Rotatably supported in the bearing members 19 is a driven shaft 24 that may be rotated by any suitable means (not shown) such as a conventional electric motor connected thereto through a gear reducer. The shaft 24 while being freely rotatable is locked against longitudinal movement by the clamp collars 25 and 26 located at opposite ends thereof adjacent the mounting members 16 and 17 and contiguous with the bearing members 19. The clamp collars may be pinned to the shaft 24 by set screws, as is shown in Figure 1.

The shaft 24 is provided with a key-way 27 that extends longitudinally therealong. Mounted upon the shaft centrally thereof are the support plates 28 and 29 that are provided respectively with bosses or collar members 30 and 31. The collars 30 and 31 are provided with a key received within the key-way 27 so that relative rotational movement between the shaft and the plates 28 and 29 is inhibited. Longitudinal positioning of the plates 28 and 29 is determined by set screws 32 and 33 that extend throguh the collars and bear against the key-way 27.

Also mounted upon the shaft 24 are a pair of cutter plates 34 and 35 equipped respectively with collars 36 and 37 having keys that are received within the key-way 27, and which may be secured in selected longitudinal positions upon the shaft 24 by the set screws 38 and 39. It will be apparent that relative rotational movement between the shaft 24 and the cutting plates 34 and 35 is prevented by the key and key-way arrangement described.

All of the plates 28, 29, 34 and 35 are circular or disc shaped and are oriented in substantial parallel relation. The plates are provided with a plurality of openings therethrough that, for purposes of identification, are designated with the numerals 40, 41, 42 and 43. The openings in each of the plates are aligned with the openings in the other plates, and all of these openings are adapted to receive the lead wires 44 and 45 of an electronic circuit component 46 that, in the illustration given, is a capacitor. The capacitor 46 is exemplary only of any of a number of circuit components that can be accommodated by the apparatus and, as has been brought out before, circuit components may have substantially any conceivable shape or external configuration and may be of various sizes.

Referring to Figure 2, it is seen that the openings 40 through 43 are in the form of slots that extend inwardly from the peripheral surfaces of the plates or discs, and are preferably angularly oriented and lie along cords drawn through the various discs. Even more specifically, the slots angle inwardly and rearwardly relative to the direction of rotation of the disc members, as is shown by the arrow in Figure 2.

The collar members 32 and 33 and the collar members 36 and 37 may be secured to their respective discs by any suitable means and, as is shown in Figure 2, such means may take the form of screws 47. Extending between the rods 14 and 15 and being slidably mounted thereon are the knife members 48 and 49. By referring to Figure 3 in particular, it is seen that the knives 48 and 49 are essentially flat plates provided at opposite ends with an opening therethrough and having aligned with the openings and rigidly secured thereto collars 50 and 51. The collars are provided respectively with set screws 52 and 53 and, as is seen in Figure 1, the collars 50 and 51 respectively are slidably received on the rods 14 and 15, and the knife members may be locked in selected longitudinal positions upon the rod members by the set screws 52 and 53. Each of the knives are provided along the upper end portion thereof with a generally V-shaped notch 54 that is provided with a cutter or cutting edge 55. The notch 54 converges inwardly and downwardly and lies along the path of movement of the slots or openings in the disc members.

In operation of the apparatus, the shaft 24 is connected to a suitable power drive and the support plates or discs 28 and 29 are spaced apart along the shaft 24 by a distance such that circuit components 46 can be received therebetween. As is evident from Figure 1, the body portions of the circuit components are positioned between the discs 28 and 29 and hang freely therebetween. Preferably, the spacing between these disc members is such that the body portions of the circuit components are snugly received therebetween so that no appreciable longitudinal shifting of the circuit components is permitted.

Next, the support plates 34 and 35 which are along the outermost sides of the discs 28 and 29 are moved to positions that are defined by the points at which the lead wires 44 and 45 are to be severed. Longitudinal positioning is accomplished through loosening and thereafter tightening the set screws 38 and 39, and positioning of the discs 28 and 29 is similarly accomplished through manipulation of the set screws 32 and 33.

Thereafter, the knife members 48 and 49 are shifted into positions contiguous with the support discs 34 and 35, and when in such positions are locked by tightening the set screws 52 and 53. The apparatus is then ready for use and the power drive will be energized to rotate the shaft 24.

As the shaft 24 rotates the discs 28, 29, 34 and 35 will be rotated and the slots or openings in each of these discs will subscribe an arc that extends through the V-shaped notches 54 of the knife members 48 and 49, and preferably the apex or base of the V-shaped notches will lie on the arc subscribed by the slots.

As the discs rotate, components 46 are placed within the slots and will assume the position shown in Figures 1 and 2. The components may be placed within the slots by hand or by any suitable means. As the discs rotate, the lead-in wires are moved into the V-notches 54 of the knife members and will be guided by the walls of the notches toward the apex thereof. As the lead wires move into the apex of the V-notches, the cutter plates 34 and 35 co-act with the stationary knife members to sever the lead wires. The components remain in the slots until the discs rotate to a position where the slots open downwardly, and at such time the components will slide freely outwardly from the plates and may be dumped into a suitable receptacle such as the pan 56 seen in Figure 2 that receives the same.

The apparatus will effectively sever the lead wires of circuit components irrespective of whether they are twisted or bent, etc., for the wide V-notches guide the wires toward the apex thereof, and the movement of the wires through the V-notches is a positive displacement because of the angular configuration of the slots through which the wires extend. Because the slots extend inwardly and rearwardly relative to the direction of rotation of the discs, the wires are moved into positive engagement with the cutting edges and are cleanly severed through coaction between the knife members and the cutter discs. The circuit components are positively held by the discs with the body portions of the components depending and swinging freely between the support discs 28 and 29. Therefore, irregular and unusual configurations are readily accommodated. The support plates 28 and 29 may be shifted independently of the discs 34 and 35 and knife members 48 and 49 so that circuit components having various body sizes are easily accommodated. Similarly, the discs 34 and 35 together with the knife members 48 and 49 may be shifted independently of the support discs so that lead-in wires of any and all circuit components may be severed at any length required. The support plates may be reversed, if necessary, to position the hubs thereof in either inwardly or outwardly facing directions and thereby afford great flexibility in the adjustment of the plates to accommodate capacitors of different sizes and to sever the lead-in wires at various lengths. If sharpening of the knife members is required, they are quickly and easily removed from the apparatus, and in replacement no serious problem of take-up exists for lead wires may be severed at any length simply by moving the knives 48 and 49 into contiguous relation with their respective cutter discs 34 and 35.

While in the foregoing specification an embodiment of the invention has been set forth in considerable detail for purposes of illustration, it will be readily apparent to those skilled in the art that numerous changes may be made in those details without departing from the principle and spirit of the invention.

I claim:

1. In apparatus for cutting the lead wires of resistors and capacitors and the like to desired length, a frame, a shaft rotatably mounted in said frame, a pair of spaced support discs and a pair of cutting discs all constrained on said shaft against relative rotational movement with respect thereto, said discs all being of substantially the same diameter and having aligned, circumferentially spaced slots extending chordally thereof with the inner termini of the slots oriented rearwardly of the outer ends thereof relative to the direction of rotation of the discs, and a pair of knife members mounted in said frame and each having a notched, generally V-shaped cutting blade of greater width at its entrance than the radial depth of said slot termini, said cutting discs being spaced from the respective outer sides of said support discs and in adjacency with said knives for successive convergence during rotation of said shaft of the respective slot termini of the cutting discs with the apex of said cutting blades to cut lead wires extending through the slots.

2. The apparatus of claim 1 in which said support discs are mounted on said shaft for axial adjustment with respect thereto for varying the spacing therebetween.

3. The apparatus of claim 1 in which said cutting discs are mounted on said shaft for axial adjustment with respect thereto, and in which said knife members are adjustably supported in said frame for selective axial positioning along said shaft.

4. The apparatus of claim 3 in which said support discs are also mounted on said shaft for axial adjustment with respect thereto.

5. In apparatus for cutting the lead wires of resistors and capacitors and the like to desired length, a plurality of discs comprising an inner pair of spaced support discs and an outer pair of cutting discs all having substantially the same diameter and being coaxially supported for rotation in a common direction, said discs having aligned, circumferentially spaced slots extending inwardly from the respective circumferences and rearwardly with respect to the direction of rotation of the discs, and a pair of knife members mounted in substantially contiguous relation with the planar surfaces of the respective cutting discs and each having a notched, generally V-shaped cutting blade facing into the path of movement of said slots so that the apex thereof is converged by the inner end of successive slots in said cutting discs as those discs rotate, whereby wires extending through the slots thereof are severed when advanced into the cutting blades.

6. The apparatus of claim 5 in which said support discs, cutting discs and knife members are adjustably supported for selective positioning relative to each other along the common axis of the discs.

7. The apparatus of claim 5 in which the mouth of each of said cutting blades is greater in width than the radial depth of said slots at the inner ends thereof.

8. The apparatus of claim 7 in which said slots extend chordally of the respective discs.

References Cited in the file of this patent

UNITED STATES PATENTS

| | | |
|---|---|---|
| 923,552 | Mill | June 1, 1909 |
| 1,478,683 | Stevens | Dec. 25, 1923 |
| 1,669,634 | Templeton | May 15, 1928 |
| 2,021,596 | Fleming | Nov. 19, 1935 |
| 2,592,019 | Farnett | Apr. 8, 1952 |